United States Patent [19]

Rayford et al.

[11] Patent Number: 4,738,882
[45] Date of Patent: Apr. 19, 1988

[54] STATIC SHIELDING SHEET MATERIALS AND BAGS FORMED THEREFROM

[75] Inventors: Robert A. Rayford, Weyauwega, Wis.; James W. Johnson, Marine on the St. Croix, Minn.

[73] Assignee: Bemis Company, Inc., Minneapolis, Minn.

[21] Appl. No.: 905,285

[22] Filed: Sep. 8, 1986

[51] Int. Cl.$^4$ .............................................. B32B 3/22
[52] U.S. Cl. ................................. 428/35; 428/218; 428/457; 428/922; 428/349
[58] Field of Search .............. 428/922, 457, 218, 35, 428/349

[56] References Cited

U.S. PATENT DOCUMENTS

| 4,154,344 | 5/1979 | Yenni, Jr. et al. | 428/922 |
| 4,156,751 | 5/1979 | Yenni, Jr. et al. | 428/922 |
| 4,424,900 | 1/1984 | Petcavich | 428/922 |
| 4,472,471 | 9/1984 | Klein et al. | 428/922 |
| 4,528,222 | 7/1985 | Rzepecki | 428/922 |
| 4,529,087 | 7/1985 | Neal et al. | 428/218 |

Primary Examiner—Edith Buffalow
Attorney, Agent, or Firm—Senniger, Powers, Leavitt and Roedel

[57] ABSTRACT

An antistatic laminated sheet material suitable for making receptacles for the protection of electronic components from electrostatic charges. The material comprises an insulating layer having a high tensile modulus, a metal layer of surface resistivity not exceeding about $10^4$ ohms/square and a conductive ink layer, said ink layer being dry and being sufficiently flexible to adapt to folds in the material. Bags formed of the material are also disclosed.

21 Claims, 1 Drawing Sheet

STATIC SHIELDING SHEET MATERIALS AND BAGS FORMED THEREFROM

BACKGROUND OF THE INVENTION

This invention relates to electrostatic-discharge protective materials, and more particularly to such materials as used for the packaging of electronic components, and bags of such material, During recent years, the increasingly frequent shipments of electrostatic-sensitive electronic components have necessitated the development of packaging materials that protect the components from electric shocks and discharges. It is particularly desirable that these materials have the flexibility to be folded over and sealed along the sides to form an inexpensive bag or envelope within which to hold the electronic components. Moreover, it is desirable that the material be transparent enough to identify visually the component through the material. Accordingly, various flexible sheet materials have been developed for such use. Typically, as shown in U.S. Pat. Nos. 3,801,418 (Cornelis et al.), 4,407,872 (Horii), and 4,424,900 (Petcavich), these materials are in the form of a sheet comprising a conductive metal layer. In at least one case, U.S. Pat. No. 4,529,087 (Neal et al.), a sheet material without a metal layer is shown imprinted with a conductive ink.

However, while these materials may afford an electronic component some electrostatic discharge protection, they suffer serious drawbacks. When such flexible sheet materials having a metal layer are creased, resulting either from the folding of the material to form a bag or envelope for receiving an electronic component or from accidental damage, the metal layer tends to crack, disrupting conductivity. Thus, the protective quality of the material is reduced.

On the other hand, a conductive ink layer, particularly one that is flexible enough to adapt to such folding or creasing, does not provide sufficient conductivity to produce the degree of electrostatic charge dissipation desired to protect sensitive electronic components.

Therefore, flexible sheet material and bags or envelopes made therefrom are still needed that will adequately protect electronic components, even after the material is folded or creased.

SUMMARY OF THE INVENTION

Among the several objects of the invention, therefore, may be noted the provision of a static shielding sheet material suitable for making receptacles for protection of electronic components from electric charges; the provision of such material that maintains adequate protection after the material is folded or creased; the provision of such material that is sufficiently transparent to identify visually an electronic component through the material; and the provision of static shielding bags formed of such material.

Briefly, the present invention involves a static shielding, laminated sheet material suitable for making receptacles for protecting electronic components from electrostatic charges, the material comprising an electrically insulating layer, a metal layer of surface resistivity not exceeding about $10^4$ ohms/square and a conductive ink layer, said ink layer being dry and being sufficiently flexible to adapt to a fold in said material.

The invention further involves a static shielding bag of laminated sheet material for protecting electronic components within the bag from electrostatic charges, the material comprising an electrically insulating layer, a metal layer of surface resistivity not exceeding about $10^4$ ohms/square and a conductive ink layer, said ink layer being dry and being sufficiently flexible to adapt to a fold in said material.

Other objects and features will be in part apparent and in part pointed out hereinafter.

DESCRIPTION OF THE PREFERRED EMBODIMENTS

Figure 1:
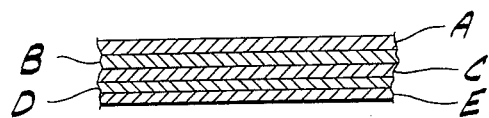
FIG. 1 is a perspective "not-to-scale cross-sectional view illustrating the material" of this invention.

Referring now to the drawings, a cross-section of a flexible, static shielding, laminated sheet material of this invention is shown in FIG. 1. This material, which is suitable for making receptacles for protecting electronic components from electrostatic charges, comprises several layers, designated A through E. These layers include an electrically insulating layer having a high tensile modulus, a metal layer of surface resistivity not exceeding about $10^4$ ohms/square and a conductive ink layer that is sufficiently flexible to adapt to a fold in the material. Preferably, the material further comprises an adhesive layer and a sealant layer. Ordinarily, the sealant layer forms a surface of the sheet material, and is designated as layer E in FIG. 1. The orientation of the other layers may be varied to some extent and will be discussed in greater detail below. The layers of the laminated material are formed by the standard methods of the industry.

Figure 2:
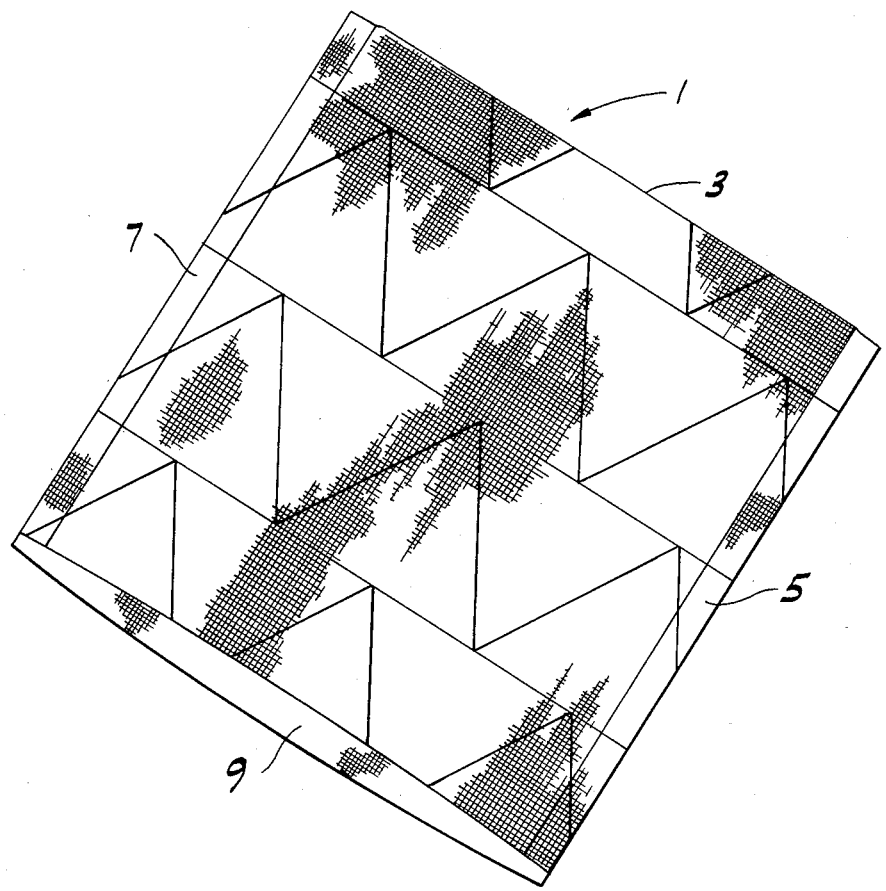
FIG. 2 is a perspective view of an antistatic bag of this invention. Corresponding reference characters indicate corresponding parts throughout the several views of the drawings.

Generally designated 1 in FIG. 2 is a static shielding bag of flexible, laminated sheet material of this invention for protecting electronic components within the bag from electrostatic charges. The bag is typically formed from a single sheet of the material folded on itself at 3 such that the sealant layer is folded on itself. The side margins of the folded sheet are sealed together, as by heat-sealing, as indicated at 5 and 7. The folding, as shown, is such that one wall of the bag extends beyond the other as indicated at 9.

The electrically insulating layer of the sheet material typically ranges from about one-third mil to 1.5 mils in thickness, preferably about 0.48 mils, and comprises a layer of electrically insulative thermoplastic, such as polyethylene terephthalate polypropylene, nylon or polycarbonate which has been biaxially oriented. Polyesters appropriate for this application include Esterfane (TM) manufactured by Curwood, Inc. and Mylar (TM), manufactured by du Pont. These electrically insulating sheet materials are found to have a volume resistivity on the order of $10^{15}$ to $10^{16}$ ohm-centimeters, well in excess of the $10^{10}$ ohm-centimeter minimum volume resistivity preferred for this layer of the laminated material.

Biaxially orienting the electrically insulating materials by stretching a sheet of the material in two directions, generally perpendicular to each other, at a temperature below the melt temperature of the material produces a material of high tensile modulus or modulus of elasticity. This high tensile modulus inhibits the electrically insulating layer in the sheet material of this invention from stretching and thereby disrupting the metal layer of the material.

The metal layer of the sheet material is usually aluminum deposited as vapor and has a surface resistivity of less than about $10^4$ ohms/square. The aluminum may be present in the form of an alloy, and nickel may be used in place of the aluminum. While the metal layer may be opaque, it is desired that the layer be sufficiently transparent so that when incorporated into the material of this invention, it allows visual identification of electronic components through the material, and preferably the metal layer is then enough to permit at least 40% light transmission.

The conductive ink layer preferably comprises a dry polyamide resin based carbon containing ink. Other inks within the contemplation of this invention include those having metal such as aluminum, copper, silver or zinc, particles or fibers instead of the carbon. A typical ink for this purpose contains about 48% by weight polyamide resin in the form of Macromelt 6239, manufactured by Henkel, about 48% by weight carbon black such as Columbian carbon 975 and about 4% by weight wax and is printed from an alcohol solvent system. While conductive inks of greater conductor-to-binder ratios may increase the conductivity of the ink layer, thereby increasing the shielding effectiveness, the conductor-to-binder ratio is limited by the viscosity of the ink and the requirement of enough binder in the ink to hold the components together. Moreover, inks of low binder content tend to be brittle and so are less likely to adapt to a fold of the substrate.

According to this invention, the ink is printed on a substrate layer preferably in the form of a grid pattern as shown in FIG. 2. The ink need not extend across the entire surface of the substrate, nor even form a grid pattern, but the chances would be increased that a charged object, such as a finger tip, will contact the material in an area where the ink will not help dissipate the charge. Moreover, it would be possible that the ink will not bridge a crease in the material, and the advantage of the ink layer would be lost.

The optional sealant layer comprises a transparent one to three mil thick layer of polyethylene copolymer, such as ethylene vinyl acetate copolymer (2% by weight vinyl acetate), containing a slip agent, such as about 500 ppm erucyl amide slip agent. The sealant layer covers one surface of the material so that, upon folding the material over on itself, the sealant layer is folded over on itself. The bag then may be formed by heat sealing the side margins at 5 and 7, the sealant layer serving as the heat sealant. By methods known in the art, the surface resistivity on the inside or outside of the bag may be altered, if so desired.

In the production of the sheet material, first two self supporting sheets are formed, which, upon adhesive laminating them together, form the sheet material of this invention. Thus an adhesive layer is normally included in the material. Adhesives useful for this purpose are well known in the industry.

Optionally, the metal layer and conductive ink layer may contact one another or be separated by an insulating layer in the laminated material. Accordingly, a variety of layer orientations is contemplated. Referring again to FIG. 1, with layer E the layer of the material toward the inside of a bag formed as described above, then layers D, C, B, and A are encountered in that order toward the outside of the bag. With the layers thusly defined, layer E is a sealant layer. Layers D and B may comprise a conductive ink layer and a metal layer, respectively, separated only by a layer C of adhesive, and layer A may comprise an electrically insulating layer. In other modifications, where the metal layer and conductive ink layer are not separated by even an adhesive layer, the orientation of the layers may be as follows: (1) layer D is an adhesive layer, layer C is the electrically insulating layer, and layers A and B are the metal and conductive ink layers, respectively, or (2) layer D is an adhesive layer, layers B and C are the metal and conductive ink layers, respectively, and layer A is the electrically insulating layer.

In another embodiment, the metal and ink layers may be separated by an insulating layer. Thus, layers B and C may be the electrically insulating layer and adhesive layer, respectively, and layers A and D may be the metal layer and conductive ink layer, respectively. In any of the embodiments, the metal layer and conductive ink layer may be interchanged.

The following examples illustrate the invention.

EXAMPLE 1

The resistance of an aluminum metallized (about 100 ohms/square) polyester (biaxially oriented polyethylene terephthalate, 0.5 mil thickness) strip (2 in. $\times$ 11 in.) was tested by placing the two surface probes (0.5 in. diameter) of an ohmmeter six inches apart on the metal surface of the strip. The resistance was found to be 100 ohms.

Next, the strip was creased across the two-inch dimension, about midway between the probes by folding the strip with the metal surface facing out, and creasing with light finger pressure. The resistance was measured after the creasing and found to be infinite, indicating that the metalized polyester had lost its shielding effectiveness.

A 0.5-inch wide strip of conductive ink was applied along the length of a second polyester strip identical to the first. The ink comprised about 48% by weight polyamide resin in the form of Macromelt 6239, manufactured by Henkel, about 48% by weight carbon black in the form of Columbian carbon 975 and about 4% by weight wax. The two surface probes were placed six inches apart on the ink-free side of the metal surface of the strip. The resistance was found to be 100 ohms. The two surface probes were placed six inches apart on the ink side of the metal surface of the strip. The resistance was found to be 400 ohms. After creasing the strip as with the first polyester strip, the resistance was found to be 400 ohms on both the metal side and on the ink side.

A spot of conductive ink was added to the crease in the first polyester strip. The resistance between the probes was found to be 400 ohms.

EXAMPLE 2

Two bags were prepared from antistatic material. From outside-in, the layers of material were as follows:
Bag 1: metal/polyester/adhesive/conductive ink/sealant
Bag 2: polyester/metal/conductive ink/adhesive/sealant The polyester, metal and ink layers were as in Example 1. The sealant was ethylene vinyl acetate (2% by weight vinyl acetate), containing about 500 ppm erucyl amide slip agent. Thus, the metal and conductive ink layers were separated by an insulator in Bag 1, and were in contact in Bag 2. Standard Electrical Industry Association (EIA) Static Shielding tests (IS-5-A, as published November, 1985) were conducted on the two bags with no crease, and after a crease which severed the metal layer. Also tested were samples of uncoated or printed layer of the sealant, sealant layer printed with conductive ink, and sealant layer coated with a metal layer.

In the EIA tests, an RC circuit is charged to apply a 1000 volt differential pulse to the capacitor with no bag in the test fixture. After placing the capacitor in the bag, a 1000 volt pulse is transmitted to the bag and the differential measured to determine whether the other capacitor plate has become charged. The charge attenuation, or shielding effectiveness is determined by subtrating the measured differential from 1000, and dividing by 10 to translate the figure to percentage terms. The results were as follows:

| SAMPLE | DIFFERENTIAL (Volts) | SHIELDING EFFECTIVENESS (%) |
|---|---|---|
| Nothing between probes | 1000 | 0 |
| Uncoated Sealant layer | 600 | 40 |
| Sealant + Ink | 140 | 86 |
| Sealant + Metal | 5 | 99.5 |
| Bag 1, Undamaged | 5 | 99.5 |
| Bag 2, Undamaged | 5 | 99.5 |
| Bag 1, Severed Metal | 80 | 92 |
| Bag 2, Severed Metal | 250 | 75 |

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A static shielding laminated sheet material suitable for making receptacles for protecting electronic components from electrostatic charges, the material comprising an electrically insulating layer, a metal layer of surface resistivity not exceeding about $10^4$ ohms/square and a conductive ink layer, said ink layer being dry and being sufficiently flexible to adapt to folds in said material.

2. A material as set forth in claim 1 further comprising a sealant layer.

3. A material as set forth in claim 2 wherein the sealant layer forms a surface of the material.

4. A material as set forth in claim 1 wherein the electrically insulating layer has a high tensile modulus and a volume resistivity exceeding $10^{10}$ ohm-centimeters.

5. A material as set forth in claim 1 wherein the material is sufficiently transparent to allow visual identification of electronic components when they are viewed through the material.

6. A material as set forth in claim 5 wherein the metal layer comprises an aluminum layer having a light transmission index of at least 40%.

7. A material as set forth in claim 1 wherein the conductive ink layer is printed in the form of a grid pattern.

8. A material as set forth in claim 1 which is sufficiently transparent to allow visual identification of the components when viewed through the material, wherein the electrically insulating layer has a high tensile modulus and a volume resistivity exceeding $10^{10}$ ohm-centimeters, and further comprising a sealant layer which forms a surface of the material.

9. A static shielding bag of laminated sheet material for protecting electronic components within the bag from electrostatic charges, the material comprising an electrically insulating layer, a metal layer of surface resistivity not exceeding about $10^4$ ohms/square and a conductive ink layer, said ink layer being dry and being sufficiently flexible to adapt to folds in said material.

10. A bag as set forth in claim 9 wherein the bag is sufficiently transparent to allow visual identification of the components within the bag.

11. A bag as set forth in claim 10 wherein the metal layer comprises an aluminum layer having a light transmission index of at least 40%.

12. A bag as set forth in claim 9 wherein the electrically insulating layer has a high tensile modulus and a volume resistivity exceeding $10^{10}$ ohm-centmeters.

13. A bag as set forth in claim 9 wherein the conductive ink layer is printed in a grid pattern on another layer.

14. A bag as set forth in claim 9 wherein the material further comprises an adhesive layer and a sealant layer.

15. A bag as set forth in claim 9 wherein the sealant layer forms an inside surface of the material toward the inside of the bag.

16. A bag as set forth in claim 15 wherein the conductive ink layer and an adhesive layer are located between the sealant layer and the metal layer.

17. A bag as set forth in claim 15 wherein the metal layer and an adhesive layer are located between the sealant layer and the conductive ink layer.

18. A bag as set forth in claim 9 wherein the bag is formed from a single sheet of the material folded over on itself, the bag thereby having two sides, conductivity being maintained across the fold by one or the other or both of the metal layer and the conductive ink layer.

19. A bag as set forth in claim 9 wherein the metal layer is in contact with the conductive ink layer.

20. A bag as set forth in claim 9 further comprising an adhesive layer separating the metal layer from the conductive ink layer.

21. A bag as set forth in claim 9 wherein the electrically insulating layer separates the metal layer from the conductive ink layer.

* * * * *